No. 873,342.                                   PATENTED DEC. 10, 1907.
L. B. BECKER.
EYEGLASSES.
APPLICATION FILED DEC. 22, 1906.
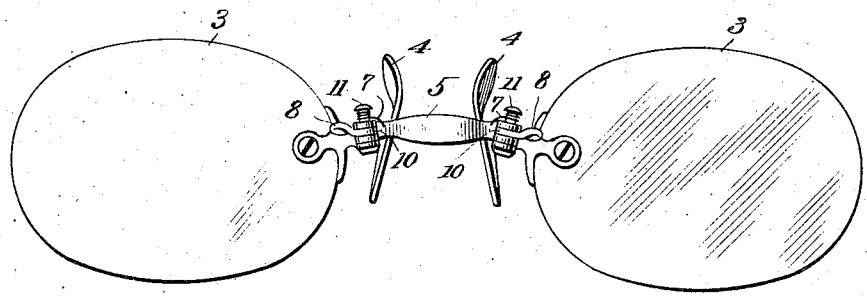
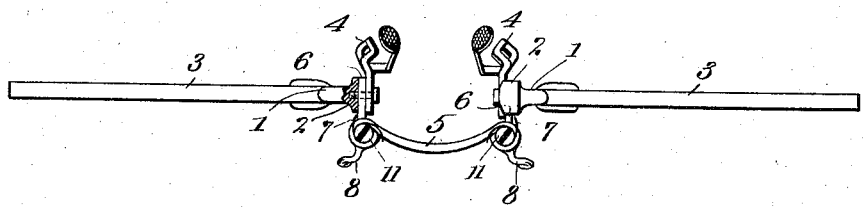
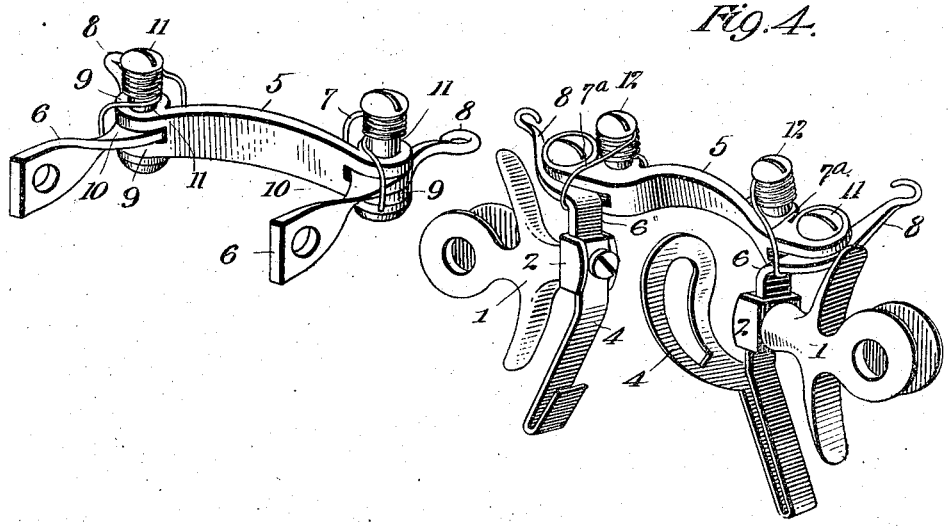
Witnesses
Frank S. Ober
Waldo M. Chapin
Inventor
Louis B. Becker
By his Attorneys
Rosenbaum & Stockbridge

UNITED STATES PATENT OFFICE.

LOUIS B. BECKER, OF NEW YORK, N. Y., ASSIGNOR, BY DIRECT AND MESNE ASSIGNMENTS, OF ONE-HALF TO E. KIRSTEIN SONS CO., OF ROCHESTER, NEW YORK, A CORPORATION OF NEW YORK, AND ONE HALF TO LEO F. ADT, OF ALBANY, NEW YORK.

EYEGLASSES.

No. 873,342.   Specification of Letters Patent.   Patented Dec. 10, 1907.

Application filed December 22, 1906. Serial No. 349,036.

*To all whom it may concern:*

Be it known that I, LOUIS B. BECKER, a citizen of the United States, residing at New York city, in the county of New York and State of New York, have invented certain new and useful Improvements in Eyeglasses, of which the following is a full, clear, and exact description.

My invention relates to eyeglasses and mountings therefor and particularly to the bridge or connection between the lenses and has for its object to provide a bridge which is practically inflexible vertically or in a direction parallel to the plane of the lenses, thereby adapting it for use with lenses for the correction of astigmatism and also one which will permit the separation of the nose guards or grips either by grasping and moving the lenses themselves or by the use of finger pieces projecting at the front and which serve also as supporting handles for the glasses.

A further object of the invention is to provide a bridge or connection that is practically rigid vertically the parts being operable by finger pieces and which is applicable to the boxes of the ordinary mountings now in common use permitting use in connection therewith of any form of nose guards.

The details of the invention will be hereinafter more fully described and the novel features thereof will be defined in the claims.

In the drawings: Figure 1 is a front elevation of a pair of eyeglasses embodying my invention; Fig. 2 is a top view of the same; Fig. 3 is a perspective view of the bridge, with its attached parts, and Fig. 4 is a perspective view of a modification.

The posts or studs 1 and boxes 2 forming the lens supporting devices of the mounting are preferably of a form which are now in common use, and the lenses 3 may be secured to the outer ends of the posts in the usual or any preferred way. The nose-guards 4 may also be of any usual or preferred form and the same have been shown as secured in the boxes 2.

The bridge comprises three sections, a rigid bridging or central portion 5 and end portions or pivot pieces, in this instance, in the form of arms 6 having rearwardly extending ends adapted to be detachably secured to the lens supporting devices, as by being arranged in the boxes 2.

The arms 6 are acted upon by springs 7 which normally urge the rearwardly projecting ends of said arms inwardly or toward each other, and said arms are provided with forwardly extending finger pieces 8. The arms 6 may be pivoted to the bridging portion 5 in any suitable way and the springs 7 may be mounted and constructed in any suitable manner. As specifically shown in Figs. 1, 2 and 3 of the drawings, however, the outer ends of the bridging portion 5 are each formed with eyes or sockets in the form of two parallel, substantially horizontal, perforated ears 9 between which the perforated ear 10 on the arm 6 is located and through which ears a stud or screw 11 passes. Surrounding the stud or screw 11, the spring 7 has been shown in the form of a coil spring, one of the ends of the same bearing against the bridging portion 5 and the other against the outer side of the arm 6. This is a convenient way of pivotally connecting the arms 6 with the ends of the bridging portion 5 so that the springs 7 may act to normally urge the rear ends of said arms toward each other. As illustrated, also, the forwardly projecting finger pieces 8 on the arms 6 have been shown as integral with said arms.

In the form of my invention shown in Fig. 4, of the drawing, the arms 6 are connected to the bridge piece 5 in a manner similar to that above described, but instead of mounting the spring 7 on the pivot stud or screw 11, a supplemental stud or screw 12 is provided at each end of the bridging portion on which a coil spring 7ª is mounted, the opposite ends of said springs acting respectively on the bridging portion and on the outer surface of the arms 6.

From the foregoing description it will be seen that by merely compressing the forwardly projecting finger pieces 8 on the arms 6, the nose-guards 4 may be separated from each other for the purpose of applying or removing the glasses from the nose of the wearer, the action being to swing the rear ends of the arms 6 outwardly on their pivots against the force of the springs 7. In addition, however, the nose-guards 4 may be separated from each other for the purpose of applying or removing the glasses by merely moving one or the other of the lenses 3 outwardly. The action in this case is similar to the action which is effected by compressing the finger pieces 8, in that the arms 6 are swung on their pivots in opposition to the pressure exerted by the springs 7. Thus the glasses may be applied or removed, either by compressing the finger pieces 8, or by moving outwardly the lenses 3.

It will also be noted that the rigid bridging portion 5 with its attached arms 6 and the springs 7 acting thereon, may be connected up with the boxes of the ordinary eyeglass mounting now in common use, and that no special form of nose-guard is necessary, but that the same may be used in connection with any of the well known forms of nose guards.

Having described my invention, I claim:—

1. In an eyeglass bridge, a bridging portion, arms pivoted thereto, springs acting upon said arms, and means adapting said arms for attachment to the lens-supporting parts of an eyeglass mounting.

2. In an eyeglass bridge, a bridging portion, arms pivoted thereto, forwardly-projecting finger pieces connected to said arms, springs acting upon said arms to force their rear ends inwardly, and means for securing the rear ends of said arms to the lens-supporting parts of an eyeglass mounting.

3. The combination with the lens-supporting parts of an eyeglass mounting, and nose guards connected thereto, of a bridging portion, arms pivoted to said bridging portion and detachably secured to said lens-supporting parts, and springs acting upon said arms to force the rear ends thereof inwardly.

4. The combination with the lens-supporting parts of an eyeglass mounting, and nose guards connected thereto, of a bridging portion, arms pivoted to said bridging portion and secured at their rear ends to said lens-supporting parts, forwardly-projecting finger pieces connected to said arms, and springs acting upon said arms to force the rear ends thereof inwardly.

5. The combination with the posts and boxes of an eyeglass mounting and nose-guards secured in said boxes, of a rigid bridging portion, arms pivoted to the ends of said bridging portion and secured at their rear ends in said boxes, and springs acting upon said arms to force the rear ends thereof inwardly.

6. The combination with the posts and boxes of an eyeglass mounting and nose guards secured in said boxes, of a rigid bridging portion, arms pivoted to the ends of said bridging portion and secured at their rear ends in said boxes, forwardly-projecting finger pieces connected to said arms, and springs acting upon said arms to force the rear ends thereof inwardly.

7. An eyeglass bridge embodying the central portion and two end portions pivoted thereto by vertically extending pivots, and springs engaging said portions to turn them on their pivots, said end portions having flat projecting ends for application to the ordinary boxes.

8. An eyeglass bridge composed of three sections formed of relatively rigid material pivoted together for relative movement in a horizontal plane and means for yieldingly holding said sections in one position, the attaching ends of the outer sections being perforated for application to the ordinary boxes.

9. In eyeglasses, the combination with a lens and a stud secured thereto, of a pivot-piece secured in said stud; a bridge pivotally mounted on said pivot-piece; and a yielding device interposed between said pivot-piece and bridge.

10. Eyeglasses consisting of a pair of lenses; a stud secured to each of said lenses; a pair of nose-guards; a pair of pivot-pieces; means for securing one of said nose-guards and pivot-pieces in each of said studs; a bridge to each end of which is pivotally secured one of said pivot-pieces; and a spring interposed between each pivot-piece and the end of the bridge pivotally secured thereto.

11. In an eyeglass, the combination with the lens supporting devices of a rigid bridging portion, pivot pieces pivotally connected to the bridging portion and detachably connected to the lens supporting devices, and springs interposed between the pivot pieces and the bridge.

In witness whereof I subscribe my signature, in the presence of two witnesses.

LOUIS B. BECKER.

Witnesses:
FRANK S. OBER,
WM. A. ROSENBAUM.